United States Patent Office 3,751,488
Patented Aug. 7, 1973

3,751,488

ALKYLATION PROCESS

Bernardus J. van Sorge, Selkirk, N.Y., assignor to General Electric Company

No Drawing. Filed July 22, 1970, Ser. No. 57,335
Int. Cl. C07c 39/06
U.S. Cl. 260—621 R 10 Claims

ABSTRACT OF THE DISCLOSURE

There is provided a process for selectively alkylating a phenolic compound in the ortho-position to the significant reduction of alkylation in the meta- and para-positions which comprises alkylating the phenolic compound with an alkanol in the presence of a molybdenum-containing catalyst.

This invention relates to the alkylation of phenolic compounds. More particularly, it contemplates the alkylation of the ortho-position of phenols having at least one ortho-hydrogen.

BACKGROUND OF THE INVENTION

The methylation of phenols having at least one ortho-hydrogen, i.e., at least one unsubstituted ortho-position, for example, phenol, cresol, i.e., o-cresol, m-cresol, p-cresol, 2,4-xylenol, 2,3-xylenol, 3,5-xylenol, and the like, is old in the art.

Winkler et al., U.S. 2,448,942, for example, discloses alkylation of phenols in the vapor phase using either alcohols or ethers as the alkylating agent and metal oxides, such as aluminum oxide, thorium oxide, zirconium oxide, zinc oxide, iron oxide, chromium oxide, manganese oxide, magnesium oxide, calcium oxide and barium oxide. Winkler et al.'s process is especially useful to fully methylate phenol and to prepare, e.g., pentamethyl phenol. The preferred catalyst is aluminum oxide. The Winkler et al. process, however, is somewhat indiscriminate and lacks specificity for ortho-alkylation to the relative exclusion of alkylation in the meta- and para-positions.

In Kunz, U. K. 717,588, there is described a process somewhat similar to the Winkler et al. process in that the same metal oxides are used, aluminum oxide being preferred, with ortho-cresol being the starting material to be alkylated with methanol. Both meta- and para-cresol are found in the products of the Kunz process indicating either a lack of specificity for ortho-alkylation and/or rearrangement of ortho-methyl substituents during the reaction.

Biller, U.S. 3,439,048, discloses the alkylation of phenol with methanol or dimethyl ether in the presence of an aqueous solution of zinc halide to obtain m-cresol-free methyl phenol mixtures. Although the products contain predominantly o-cresol, substantial amounts of p-cresol and 2,4-xylenol are found in the reaction products. Thus the Biller process apparently permits either production of para-substituted phenols or rearrangements of isomeric cresols and xylenols, indicating a lack of specificity for ortho-alkylation.

Ortho-alkylated phenols have valuable properties. They may be used, for example, in making bisphenols, or as stabilizers for gasoline or other fuels for internal combustion engines. They are particularly useful in making polyarylene ethers, a valuable class of thermoplastic polymers disclosed and claimed, for example, in A. S. Hay, U.S. 3,306,875. As is disclosed in the Hay patent, polyphenylene ethers having the highest molecular weight and most desirable properties are prepared from mono- or di-ortho substituted phenols having an unsubstituted para-position, which joins with the phenolic hydrogen in a similar molecular to form polymeric chains.

It would be very desirable to have a process to prepare preferred ortho-substituted, para-unsubstituted phenolic compounds in which there is a selective direct introduction of alkyl groups in the ortho-position. Furthermore, it would be advantageous to provide such a process in which a rearrangement of the desired products to isomeric cresols and xylenols with para-substitution is remarkably suppressed.

Unexpectedly, there has now been found a very convenient process for producing high yields (high degree of conversion) of mono-o-alkyl or di-o-alkyl phenols with a very high degree of ortho-selectivity, i.e., a high proportion of the starting phenol is converted to products in which alkylation has occurred at only one or both of the ortho-positions.

DESCRIPTION OF THE INVENTION

According to the present invention there is provided a process for selectively alkylating a phenolic compound in the ortho-position to the significant retardation of alkylation in the meta- and para-positions which comprises alkylating the phenolic compound with an alkanol in the presence of a molybdenum-containing catalyst.

Such a process, in essence, comprises alkylating a phenolic compound having at least one ortho-hydrogen by reacting said phenolic compound with an alkanol in the presence of a catalytically active compound selected from the group consisting of molybdenum oxide, molybdic acid and salts of molybdic acid at a temperature of from about 200° C. to about 600° C.

Illustrative phenolic compounds used as starting materials are of the general formula

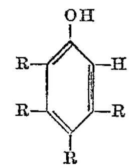

wherein each R is a monovalent substituent such as hydrogen, 1–12C alkyl, aryl, and alkylaryl, e.g., methyl, ethyl, n-propyl, phenyl, o-methylphenyl, p-methylphenyl, 2,6-xylyl, and the like. Especially useful starting materials are phenol (R is hydrogen), o-cresol, m-cresol, p-cresol, o-phenylphenol and 3,5-xylenol. Phenol is a preferred starting material.

Suitable alkanols may be represented by the formula $$R^1\text{—OH}$$

wherein $R^1$ is saturated alkyl of up to about 12 carbon atoms, straight chain or branched chain. Illustrative alkanols are those wherein $R^1$ is methyl, ethyl, n-propyl, i-propyl, n-butyl, t-butyl, hexyl, octyl, 2-ethylhexyl, decyl and dodecyl. Preferred alkanols are (lower)alkanols, i.e., those in which $R^1$ contains from about 1 to about 6 carbon atoms, such as methyl, ethyl, propyl, isopropyl, butyl, isobutyl, tertiary butyl, amyl and hexyl alcohols. Especially preferred as the alkanol is methanol.

Suitable catalytically active compounds are molybdenum oxide, molybdic acid, and salts of molybdic acid. Any form of molybdenum oxide, e.g., molybdenum dioxide, $MoO_2$, or sesquioxide, $Mo_2O_5$ or trioxide, $MoO_3$, or in general, any salt of molybdic acid, $H_2MoO_4$, is suitable for use in this process. The only requirement appears to be that significant amounts of aluminum oxide and silicon oxide should be absent. These tend to decrease selectivity.

The salts of molybdic acid will be those of trivalent or hexavalent molybdenum and, in general will be of the formulae $M_2(MoO_4)$ or $M_2Mo_2O_7$, i.e., corresponding to the chromates and bichromates, respectively, or they will be more complex, such as $M_6Mo_7O_{24}$. In the simpler salts M will represent a metal cation derived, for example, from the alkali metals, e.g., sodium, potassium, lithium or the alkaline earth metals, e.g., calcium or magnesium, and the like. The more complex formulas are illustrated by ammonium para-molybdate.

Preferred catalytically active compounds are molybdenum (tri)oxide and ammonium para-molybdate.

In order to obtain the maximum yield of ortho-alkylated products it is preferred to use at least one mole of alkanol and preferably from one to three moles of alkanol for each ortho-position in the phenolic compound to be alkylated. For example, if phenol is to be methylated to produce a maximum yield of 2,6-xylenol(2,6-dimethylphenol), it is preferred to use at least 2 moles and especially preferred to use from 2 to 6 moles of methanol for each mole of phenol. Of course, if the phenolic compound starting material is already mono-substituted in one of the ortho-positions, maximum yields will be obtained with at least one mole of alkanol, e.g., methanol, per mole of phenolic compound, e.g., o-cresol.

In one of its embodiments, the present invention contemplates carrying out the alkylation reaction with methanol containing from 1 to 20 mole percent formaldehyde. The formaldehyde can be used in any convenient form, e.g., as trioxymethylene or paraformaldehyde. This embodiment increases the yield of the desired product and enhances the production rate, especially at lower reaction temperatures, without affecting the selectvity of the catalyst for ortho-substitution.

The amount of catalyst used is not particularly critical. In general the molar ratio can fall in the range of 0.01 to 1.0 mole of catalyst per mole of alkanol.

In general, it will be found that that the phenolic compound will not react with the alkanol, even in the presence of the catalyst, at ambient temperatures and that the mixture will require heating before the reaction proceeds. The temperature will be in the range of from about 200° C. to about 600° C., preferably from about 200° C. to about 350° C.

The present process can be carried out when the phenolic compound and the alkanol are heated either in the liquid phase or in the vapor phase. As will be apparent to those skilled in the art, if the reaction temperature is above the boiling point of the reactants at a given pressure, they will be in the vapor phase. On the other hand, if the pressure in the reaction vessel is at least equal to or higher than the equilibrium pressure of the reactants and products at the elevated temperature, the reaction will be in the liquid phase.

Furthermore, although not critical, since atmospheric and sub-atmospheric pressures can be used, an elevated pressure is desirable because the yield of the desired alkylated phenolic products appears to be enhanced while, at the same time, the formation of alkylated hydrocarbon by-products apparently is inhibited. In such cases, the pressure under which the reaction is carried out is from about 20 to about 400 atmospheres, i.e., 300 to about 6000 p.s.i.g. Especially preferably, the pressure will be about 200 to 300 atmospheres.

In one manner of proceeding, phenol will be mixed with at least 2 moles of methanol, based on phenol, and after adding the catalyst, e.g., 0.01 mole of ammonium para-molybdate, based on methanol, the mixture will be heated to 350° C. for about 3 hours. The maximum pressure will be about 335 atm. The mixture is cooled to room temperature, the catalyst is separated and the products are recovered by any conventional means, e.g., by distillation.

Any unreacted phenol and any products with ortho-hydrogen substituents may be recycled to increase the conversion to the desired ortho-methylated products.

Any suitable type apparatus may be used. For example, a stirring autoclave of an entirely conventional type is especially convenient. On the other hand, if it is desired to carry out the process in a continuous fashion, then a heated tubular reactor will be used.

DESCRIPTION OF THE PREFERRED EMBODIMENTS

In order that those skilled in the art may better understand the invention, the following examples are given by way of illustration and not by way of limitation.

Example 1

The reactor consists of a stirred heated autoclave.

Ninety-four grams of phenol, 64 g. of methanol, 30 g. of ammonium para-molybdate $[(NH_4)_6Mo_7O_{24}.4H_2O]$ and 2.0 g. of para-formaldehyde are transferred to the reactor flushed with nitrogen and heated from 20° C. to 350° C. in 3 hours. The maximum pressure attained is 5000 p.s.i.g. (340 atm.). The reactor is cooled to about 20° C. and the residual pressure is 40 atm. The reactor is opened and no ammonia odor is detected. The product is analyzed by gas chromatography using a column of Apiezon-L on Chromosorb W. The product distribution is shown in Table I.

TABLE I

| | |
|---|---|
| Total phenol (wt. percent) | 28.4 |
| o-Cresol | 36.8 |
| 2,6-xylenol | 18.3 |
| 2,4-xylenol | 3.4 |
| 2,4,6-mesitol | 4.4 |
| Anisoles | 8.7 |
| | 100.0 |

From the results shown in Table I, it is seen that ammonium para-molybdate is an active and selective catalyst. Almost all of the alkylation in the presence of ammonium para-molybdate has occurred only in the two ortho-positions. This is in contrast with the substantial amount of para-methylation obtained with the aluminium oxide catalyst of Winkler, U.S. 2,488,942, Example 1; and with the zinc halide catalyst of Biller, U.S. 3,439,048, Example 1.

Example 2

The procedure of Example 1 is repeated, omitting the paraformaldehyde. Substantially the same results are obtained, although the reaction proceeds at a slightly lower rate.

Example 3

The procedure of Example 1 is repeated, substituting for ammonium para-molybdate, stoichiometrically equivalent quantities of molybdenum dioxide, $MoO_2$, molybdenum trioxide, $MoO_3$, molybdenum sesquioxide, $Mo_2O_3$, and of sodium molybdate $Na_2(MoO_4)$, potassium bimolybdate, $K_2Mo_2O_7$, calcium molybdate, $CaMoO_4$, magnesium molybdate, $MgMoO_4$, bismuth molybdate, $$Bi_2(MoO_4)_3$$

lead molybdate, $PbMoO_4$ and molybdic acid, $H_2MoO_4$. Substantially the same results are obtained.

Example 4

The procedure of Example 1 is repeated, omitting the formaldehyde, and substituting for the methanol stoichiometrically equivalent amounts of the following alkanols: ethyl, propyl, n-butyl, isopropyl, isobutyl, tertiary butyl, n-amyl and n-hexyl. There are obtained, respectively, phenols, mono- and di-ortho-substituted with ethyl, propyl, n-butyl, isopropyl, isobutyl, tertiary butyl, n-amyl and n-hexyl groups.

Example 5

The procedure of Example 1 is repeated substituting for the phenol, stoichiometrical amounts of the following phenolic compounds with at least one ortho-hydrogen:

o-cresol;
m-cresol;
p-cresol;
3,5-xylenol; and
2-phenylphenol

The predominating products are, respectively, 2,6-xylenol;
2,3,6-trimethylphenol;
2,4,6-trimethylphenol;
2,3,5,6-tetramethylphenol; and
2-methyl-6-phenylphenol.

Similarly, after substituting for phenol the following phenolic compounds:

2,3-xylenol;
2,4-xylenol;
2,5-xylenol;
2,3,4-trimethylphenol;
2,3,5-trimethylphenol;
3,4,5-trimethylphenol;
2,3,4,5-tetramethylphenol;
4-phenylphenol;
2-tolylphenol;
2,4-diphenylphenol;
2,3-diphenylphenol;
2-xylylphenol;
2-mesitylphenol;
2-durylphenol;
4-methyl-2-phenylphenol;
2-tolyl-4-phenylphenol;
2-phenyl-4-tolylphenol; and
3-methyl-5-phenylphenol in the procedure of Example 1 there are obtained the corresponding mono-ortho-methylated and di-ortho-methylated phenols, depending on whether one or two of the ortho-positions is unsubstituted in the starting material.

Although the above examples have shown various modifications and variations of the present invention, other modifications and variations are possible in light of the above teachings. It is therefore to be understood that changes may be made in the particular embodiments of the invention described which are within the full intended scope of the invention as defined by the appended claims.

I claim:

1. A process for the ortho-alkylation of a phenolic compound of the general formula

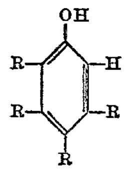

wherein each R is a monovalent substituent selected from the group consisting of hydrogen, methyl, phenyl and methyl-substituted phenyl, said process comprising reacting said phenolic compound with an alkanol in the presence of a catalytic amount of a catalyst consisting of a catalytically active compound selected from the group consisting of molybdic acid and alkali metal, alkaline earth metal and ammonium salts of molybdic acid at a temperature of from about 200° C. to about 600° C.

2. A process as defined in claim 1 wherein each R is hydrogen.

3. A process as defined in claim 2 wherein the ratio of alkanol to phenolic compound is at least two moles of alkanol per mole of the phenolic compound.

4. A process as defined in claim 1 wherein said catalytically active compound is ammonium para-molybdate.

5. A process as defined in claim 1 wherein the alkanol is a (lower) alkanol of up to 6 carbon atoms.

6. A process as defined in claim 5 wherein said (lower) alkanol is methanol.

7. A process as defined in claim 6 wherein the methanol contains from about 1 to about 20 mole percent of formaldehyde.

8. A process wherein phenol is reacted with methanol in the presence of a catalytic amount of a catalyst consisting of ammonium para-molybdate, at a temperature of from about 200° C. to about 850° C. to produce 2,6-xylenol.

9. A process as defined in claim 8 wherein the ratio of methanol to phenol is at least two moles of methanol per mole of phenol.

10. A process for the ortho-alkylation of a phenolic compound of the general formula:

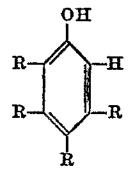

wherein each R is a monovalent substituent selected from hydrogen, 1–12C alkyl, 1–12C aryl and 1–12C alkylaryl, said process comprising reacting said phenolic compound with an alkanol in the presence of a catalytic amount of a catalyst consisting of ammonium para-molybdate at a temperature of from about 200° C. to about 600° C.

References Cited

UNITED STATES PATENTS

| | | | |
|---|---|---|---|
| 3,446,856 | 5/1969 | Hamilton | 260—621 R |
| 2,103,736 | 12/1937 | Skraup | 260—624 C |
| 2,572,019 | 10/1951 | Fawcett et al. | 260—612 D |
| 3,439,048 | 4/1961 | Biller | 260—621 R |
| 3,426,358 | 2/1969 | Schulichting et al. | 260—621 R |

FOREIGN PATENTS

| | | | |
|---|---|---|---|
| 44/27,367 | 11/1969 | Japan | 260—621 R |
| 1,061,775 | 3/1967 | Great Britain | 260—624 C |
| 717,588 | 10/1954 | Great Britain | 260—621 R |
| 603,254 | 5/1961 | Belgium | 260—624 C |

OTHER REFERENCES

Derwent: Belgian Report 81A, p. A1, No. 603,254, Sept. 1, 1961.

HOWARD T. MARS, Primary Examiner

U.S. Cl. X.R.

260—610, 624 C